(12) United States Patent
Mita et al.

(10) Patent No.: US 6,315,918 B1
(45) Date of Patent: *Nov. 13, 2001

(54) NON-AQUEOUS ELECTROLYTIC SOLUTION FOR CAPACITOR AND CAPACITOR CONTAINING NON-AQUEOUS ELECTROLYTIC SOLUTION

(75) Inventors: Satoko Mita, Sodegaura; Tsuneaki Koike, Tokyo; Takeshi Ishitoku, Yokohama; Tatsuyoshi Ishida, Sodegaura; Yoshinori Takamuku; Hideki Shimamoto, both of Kyoto, all of (JP)

(73) Assignees: Mitsui Chemicals Inc., Tokyo; Matsushita Electric Industrial Co., Ltd., Osaka, both of (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/151,663

(22) Filed: Sep. 11, 1998

(30) Foreign Application Priority Data

| Sep. 11, 1997 | (JP) | 9-247145 |
| Sep. 11, 1997 | (JP) | 9-247146 |
| Sep. 11, 1997 | (JP) | 9-247147 |
| Dec. 1, 1997 | (JP) | 9-330493 |
| Dec. 25, 1997 | (JP) | 9-356883 |
| Apr. 6, 1998 | (JP) | 10-092969 |
| Apr. 6, 1998 | (JP) | 10-092970 |
| Apr. 6, 1998 | (JP) | 10-092971 |

(51) Int. Cl.$^7$ ................................................. H01M 10/40
(52) U.S. Cl. ........................ 252/62.2; 361/502; 361/503; 429/330; 429/331
(58) Field of Search ..................... 252/62.2; 361/502, 361/503; 429/330, 331

(56) References Cited

U.S. PATENT DOCUMENTS

| 5,086,374 | * | 2/1992 | MacFarlane | 252/62.2 |
| 5,626,981 | * | 5/1997 | Simon et al. | 429/330 |
| 5,712,059 | * | 1/1998 | Barker et al. | 429/331 |

FOREIGN PATENT DOCUMENTS

| 70845 2A | 4/1996 | (EP) . |
| 05074486 A | 3/1993 | (JP) . |
| 06009610 A | 1/1994 | (JP) . |
| 06052887 A | 2/1994 | (JP) . |
| 08059557 A | 3/1996 | (JP) . |
| 08073749 A | 3/1996 | (JP) . |
| 08222234 A | 8/1996 | (JP) . |
| 9-14819 7A | 6/1997 | (JP) . |
| WO9621639A | 9/1996 | (WO) . |
| WO9744842A | 1/1998 | (WO) . |

OTHER PUBLICATIONS abstract for JP 8–222,234.*
abstract for JP 6–52887.*

* cited by examiner

Primary Examiner—C. Melissa Koslow
(74) Attorney, Agent, or Firm—Birch, Stewart, Kolasch & Birch, LLP

(57) ABSTRACT

Non-aqueous electrolytic solutions for capacitors which release a little gas, have excellent potential window of electrochemical stability and enable capacitors to show excellent charging/discharging cycle properties and safety performance, and capacitors containing such non-aqueous electrolytic solutions.

The non-aqueous electrolytic solution for capacitors comprises an electrolytic solution containing at least one cyclic carbonic ester selected from specified compounds and an electrolyte.

12 Claims, 1 Drawing Sheet

NON-AQUEOUS ELECTROLYTIC SOLUTION FOR CAPACITOR AND CAPACITOR CONTAINING NON-AQUEOUS ELECTROLYTIC SOLUTION

TECHNICAL FIELD

The present invention relates to a non-aqueous electrolytic solution for capacitors which contains primarily cyclic carbonic ester, specifically a non-aqueous electrolytic solution for electric double layer capacitors, more specifically a capacitor showing high energy density and excellent withstand voltage and charging/discharging cycle properties, and especially a non-aqueous electrolytic solution that can provide electric double layer capacitors.

TECHNICAL BACKGROUND

Up to the present, capacitors, particularly electric double layer capacitors having a capacity intermediate between that of a battery and that of a capacitor, as a backup power supply for IC's and memories and a supplement or alternative to secondary batteries, have been used widely as a low-power direct-current power supply. In recent years, however, there have been new portable electronic devices coming into being one after another, such as VTR with a built-in camera, cellular phones and laptop computers. Amid this trend, there has been a growing demand that those electric double layer capacitors used as a backup power supply and a supplement or alternative to secondary batteries should have higher energy density.

These electric double layer capacitors, unlike batteries, do not convert a chemical change into electric energy. They utilize a large capacity of the electric double layer that occur between the electrodes and the electrolytic solution to put in and out an electric charge in the same manner as the charge and discharge of batteries. Such electric double layer capacitors are normally so constructed that they use a non-corrosive electrolytic solution that does not corrode the capacitor container or the collector made of aluminum, copper or the like and two electrodes formed from a material having a large surface area such as activated carbon and a binder such as fluororesins are so arranged that they face each other via a porous separator made of polyethylene or polypropylene.

As the electrolytic solution for such electric double layer capacitors, aqueous-solution-based electrolytic solution and organic-solvent-based electrolytic solution (non-aqueous electrolytic solution) are used. However, aqueous-solution-based electrolytic solution showing low potential window of electrochemical stability (approx. 1.2 V) are difficult to provide high-energy-density electric double layer capacitors.

By contrast, compared with aqueous-solution-based electrolytic solution, organic-solvent-based electrolytic solution (non-aqueous electrolytic solution) show high potential window of electrochemical stability and therefore make the formation of high-energy-density capacitors possible. Because of this, the electric double layer capacitors using non-aqueous electrolytic solution are rapidly beginning to come into use as a backup power supply for electronic equipment for non-military use.

As such non-aqueous electrolytic solution, a mixture of a non-aqueous solvent such as cyclic carbonic ester exhibiting a high dielectric constant and an electrolyte such as tetra-ethylammonium tetra fluoroborate, for example, is used.

However, such an electrolytic solution as mentioned above has had the problem of the inner electrical resistance of the A capacitor going up due to its low electric conductivity, making it difficult to obtain high-output capacitors. Furthermore, when future capacitors have high energy density, the aforementioned electrolytic solution might be insufficient in potential window of electrochemical stability. Because of this, it has been hoped that a non-aqueous electrolyte having better charging/discharging cycle properties will come into existence.

SUMMARY

The inventors of the present invention sought a solution to the problems of the conventional technology as described above. The present invention is intended to provide non-aqueous electrolytic solutions which release little gas, have excellent potential window of electrochemical stability and enable capacitors to show excellent charging/discharging cycle properties and safety performance, and capacitors containing such non-aqueous electrolytic solutions.

The non-aqueous electrolytic solution for capacitors of the present invention comprises an electrolytic solution containing at least one cyclic carbonic ester selected from compounds of the following (1), (2) and (3) and an electrolyte:

(1) A compound which is represented by Formula (I):

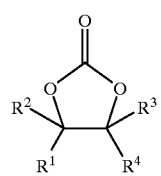

(I)

(wherein $R^1$ to $R^4$, which may be the same or different, are hydrogen, the alkyl group, the unsaturated hydrocarbon group or the aryl group or a group represented by —$CH_2$—O—A, wherein A stands for $R^5$, CO—$R^5$ or —CO—O—$R^5$ [wherein $R^5$ is the alkyl group or the unsaturated hydrocarbon group]); said compound being such that:

(i) In Formula I, at least one of $R^1$ to $R^4$ is the aforementioned group represented by —$CH_2$—O—A, with the remaining groups selected from among hydrogen, the alkyl group and the unsaturated hydrocarbon group.

(ii) In Formula I, at least one of $R^1$ to $R^4$ is the unsaturated hydrocarbon group, with the remaining groups selected from among hydrogen, the alkyl group, the aryl group and the unsaturated hydrocarbon group.

(iii) In Formula I, at least one of $R^1$ to $R^4$ is an aryl group and the remaining $R^1$ to $R^4$ are selected from among the alkyl group and the aryl group.

(2) A compound which is represented by Formula (II):

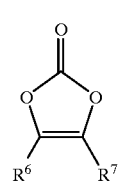

(II)

(wherein $R^6$ and $R^7$, which may be the same or different, is hydrogen atom, the alkyl group or the unsaturated hydrocarbon group); and (3) A compound which is represented by Formula (III):

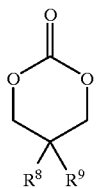

(III)

(wherein $R^8$ and $R^9$, which may be the same or different, are the alkyl group, the aryl group or the unsaturated hydrocarbon group).

The present invention also provides capacitors containing the electrolytic solution comprising the electrolyte solvent containing the cyclic carbonic ester of the present invention and an electrolyte.

The non-aqueous electrolytic solution for capacitors of the present invention releases a little gas and shows high potential window of electrochemical stability and excellent safety performance and charging/discharging cycle properties.

Especially, the use of the non-aqueous electrolytic solution for capacitors of the present invention in the formation of capacitors enables the obtaining of capacitors which generate high voltage, release a little gas and show excellent charging/discharging cycle properties and energy density. This effect manifests itself markedly especially when the electrolytic solution is used in electric double layer capacitors.

DETAILED DESCRIPTION

Figure 1:
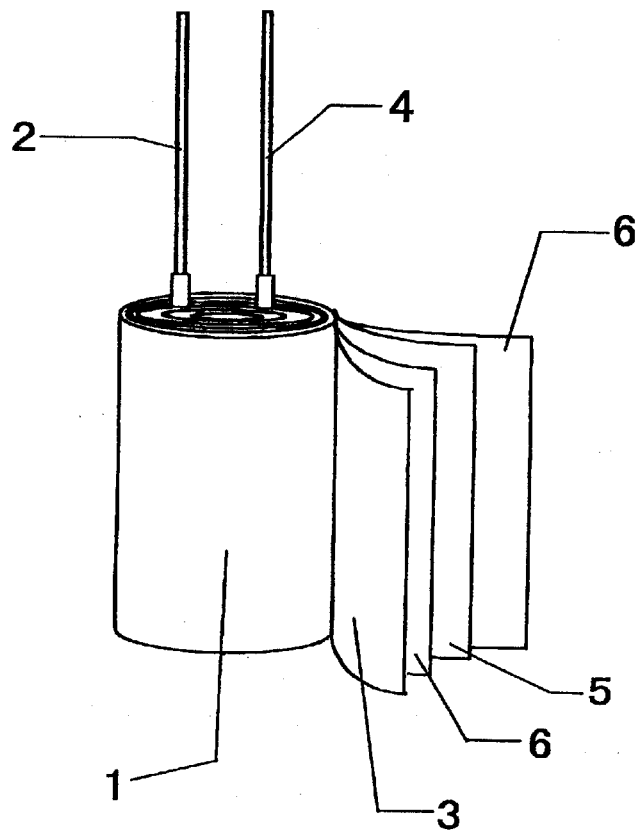
FIG. 1 is a perspective view illustrating the structure of the capacitor element of a wound-type electric double layer capacitor of the present invention.

Given below is a specific description of the non-aqueous electrolytic solutions and capacitors of the present invention.

Non-aqueous Electrolytic Solution for Capacitors

The non-electrolytic solution of the present invention comprises the non-aqueous solvent containing cyclic carbonic ester and an electrolyte.

Cyclic carbonic ester:

Given below is a specific description of cyclic carbonic ester.

First, an explanation is given of the compound(1)which is represented by Formula (I):

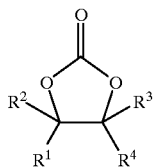

(I)

(wherein $R^1$ to $R^4$, which may be the same or different, are hydrogen, the alkyl group, the unsaturated hydrocarbon group or the aryl group or a group represented by —$CH_2$—O—A, wherein A stands for $R^5$, CO—$R^5$ or —CO—O—$R^5$ [wherein $R^5$ is the alkyl group or the unsaturated hydrocarbon group]); said compound being such that:

(i) In Formula I, at least one of $R^1$ to $R^4$ is the aforementioned group represented by —$CH_2$—O—A, with the remaining groups selected from among hydrogen, the alkyl group and the unsaturated hydrocarbon group.

(ii) In Formula I, at least one of $R^1$ to $R^4$ is the unsaturated hydrocarbon group, with the remaining groups selected from among hydrogen, the alkyl group, the aryl group and the unsaturated hydrocarbon group.

(iii) In Formula I, at least one of $R^1$ to $R^4$ is an aryl group and the remaining $R^1$ to $R^4$ are selected from among the alkyl group and the aryl group.

In Formula (I), as examples of the alkyl group, a straight-chain or branched alkyl group having 1 to 20 carbon atoms, preferably an alkyl group having 1 to 6 carbon atoms, more preferably an alkyl group having 1 to 4 carbon atoms can be cited. Examples include methyl,ethyl,n-propyl,isopropyl, n-butyl, isobutyl, sec-butyl, tert-butyl, neopentyl and n-hexyl. Out of them, methyl, ethyl, n-propyl, isopropyl, n-butyl, isobutyl, sec-butyl, tert-butyl are most preferable. As examples of the unsaturated hydrocarbon group, a straight-chain or branched unsaturated hydrocarbon group having 2 to 20 carbon atoms, preferably an unsaturated hydrocarbon group having 2 to 6 carbon atoms, more preferably an unsaturated hydrocarbon group having 2 to 4 carbon atoms can be cited. Specific examples include straight-chain or branched alkenyl groups such as vinyl, allyl and isopropenyl and straight-chain or branched alkynyl groups such as ethynyl and propargyl. As examples of the aryl group, aryl groups having 6 to 30 carbon atoms, preferably 6 to 12 carbon atoms, such as phenyl, benzyl, naphthyl, biphenyl, terphenyl, phenanthryl and anthracenyl can be cited.

The aforementioned alkyl group, unsaturated hydrocarbon group and aryl group may have a substituent group. Such substituent group may be the aforementioned alkyl group, aryl group and unsaturated hydrocarbon group, for example. In other words, the alkyl group, unsaturated hydrocarbon group and aryl group may be an alkyl-substituted unsaturated hydrocarbon group, alkyl-substituted aryl group, aryl-substituted alkyl group and aryl-substituted unsaturated hydrocarbon group, for example. As another preferable example of such substituent group, an oxygen-containing group can be cited.

Examples of such oxygen-containing group include the alkoxy group, aryloxy group, alkanoyloxy group, alkenoyloxy group, ester group, acyl group, acyloxy group, carboxyl group, carbonate group, hydroxy group, peroxy group and carboxylic acid anhydride group. Out of these, the alkoxy group, aryloxy group, acyl group, particularly alkanoyl group and alkenoyl group, acyloxy group, particularly alkanoyloxy group and alkenoyloxy group can be cited as preferable examples.

As examples of the alkoxy group, preferably an alkoxy group having 1 to 30 carbon atoms, more preferably an alkoxy group having 1 to 6 carbon atoms, can be cited. Specific examples include methoxy, ethoxy, n-propoxy, isopropoxy, n-butoxy, isobutoxy and tert-butoxy. As examples of the aryloxy group, an aryloxy group having 6 to 30 carbon atoms, preferably an aryloxy group having 6 to 12 carbon atoms, can be cited. Specific examples include phenoxy group, 2,6-dimethylphenoxy group and 2,4,6-trimethylphenoxy group.

An explanation is given of the compound (i) which is compound represented by Formula (I) wherein at least one of $R^1$ to $R^4$ is the aforementioned group represented by the aforementioned —$CH_2$—O—A, with the remaining groups selected from among hydrogen, the alkyl group and the unsaturated hydrocarbon group, the following compounds (A), (B) and (C) can be cited:

(A) The cyclic carbonic ester which is represented by the following general formula (IV):

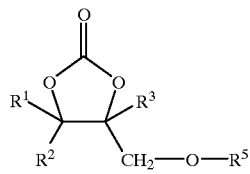

(IV)

wherein $R^1$ to $R^3$, which may be the same or different, are hydrogen atom, an alkyl group having 1 to 6 carbon atoms, an unsaturated hydrocarbon group having 2 to 6 carbon atoms, a hydrocarbon group having 1 to 7 carbon atoms and containing the alkoxy group or an unsaturated hydrocarbon group having 2 to 7 carbon atoms and containing the alkoxy group, and $R^5$ is an alkyl group having 1 to 6 carbon atoms or an unsaturated hydrocarbon group having 2 to 6 carbon atoms both of which may or may not contain oxygen Particularly, $R^1$ to $R^3$ are preferably H, —$CH_3$, —$C_2H_5$, —CH=$CH_2$, a hydrocarbon group having 1 to 7 carbon atoms and containing the alkoxy group or an unsaturated hydrocarbon group having 2 to 7 carbon atoms and containing the alkoxy group, especially preferably H or —$CH_3$.

$R^5$ is an alkyl group having 1 to 6 carbon atoms or unsaturated hydrocarbon group having 2 to 6 carbon atoms both of which may or may not contain oxygen. Out of these, an unsaturated hydrocarbon group containing or not containing oxygen is preferable. Particularly, the aryloxymethyl group and the 1-propenyloxymethyl group are used preferably. For a combination of $R^1$ to $R^3$ and $R^5$, $R^1$ to $R^3$ are preferably H or —$CH_3$, and $R^5$ is preferably an unsaturated hydrocarbon group.

Examples of such cyclic carbonic ester include 4-propyloxymethyl-1,3-dioxolane-2-one, 4-allyloxymethyl-1,3-dioxolane-2-one, 4-allyloxymethyl-5-methyl-1,3-dioxolane-2-one, 4-allyloxymethyl-4-vinyl-1,3 -dioxolane-2-one, 4-allyloxymethyl-5-vinyl-1,3-dioxolane-2-one, 4-allyloxymethyl-5-alllhylene-1,3-dioxolane-2-one, 4-allyloxymethyl-5-(2'-methoxyethyl)-1,3-dioxolane-2-one, 4-(1'-propenyloxymethyl)-1,3-dioxolane-2-one, 4-(1'-propenyloxymethyl)-5-vinyl-1,3-dioxolane-2-one, 4-propargyloxy-1,3-dioxolane-2-one, 4-(3'-butenyloxymethyl)-1,3-dioxolane-2-one, 4-(2'-butenyloxymethyl)-1,3-dioxolane-2-one, 4,5-dimethoxymethyl-1,3-dioxolane-2-one, 4-methoxymethyl-5-vinyl-1,3-dioxolane-2-one, 4-methoxymethyl-4,5-divinyl-1,3-dioxolane-2-one, and 4-ethoxymethyl-4-vinyl-1,3-dioxolane-2-one. Out of these, especially preferable are 4-allyloxymethyl-1,3-dioxolane-2-one, 4-(1'-propenyloxymethyl)-1,3-dioxolane-2-one, 4-allyloxymethyl-5-vinyl-1,3-dioxolane-2-one and 4-(1'-propenyloxymethyl)-5-vinyl-1,3-dioxolane-2-one.

(B) The cyclic carbonic ester which is represented by the following (I):

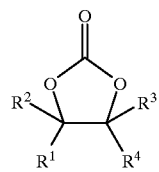

(I)

wherein at least one of $R^1$ to $R^4$ is a group represented by —$CH_2$—O—CO—X (wherein x is hydrogen atom, an alkyl group having 1 to 6 carbon atoms or an unsaturated hydrocarbon group having 2 to 6 carbon atoms) and the remaining groups, which may be the same or different, are any of hydrogen atom, an alkyl group having 1 to 6 carbon atoms, an unsaturated hydrocarbon group having 2 to 6 carbon atoms, a hydrocarbon group having 1 to 6 carbon atoms and containing the alkoxy group, alkanoyloxy group or alkenoyloxy group and an unsaturated hydrocarbon group having 2 to 6 carbon atoms and containing the alkoxy group, alkanoyloxy group or alkenoyloxy group.

In the aforementioned Formula (I), X is preferably an unsaturated hydrocarbon group having 2 to 6 carbon atoms, and particularly the vinyl group and the isopropenyl group are used preferably.

Furthermore, at least one of $R^1$ to $R^4$ of the cyclic carbonic ester(B) represented by the aforementioned Formula (I) is —$CH_2$—O—CO—X (wherein X is hydrogen atom, an alkyl group having 1 to 6 carbon atoms or an unsaturated hydrocarbon group having 2 to 6 carbon atoms) and the remaining groups, which may be the same or different, are preferably H, —$CH_3$, —$C_2H_5$ or —CH=$CH_2$.

Examples of such cyclic carbonic ester(B) include 4-acetoxymethyl-1,3-dioxolane-2-one, 4-propionyloxymethyl-5-vinyl-1,3-dioxolane-2-one, 4-acryloyloxymethyl-1,3-dioxolane-2-one, 4-acryloyoxymethyl-5-methyl-1,3-dioxolane-2-one, 4-acryloyoxymethyl-4-vinyl-1,3-dioxolane-2-one, 4-methacryloyoxymethyl-1,3-dioxolane-2-one, 4-methacryloyoxymethyl-5-vinyl-1,3-dioxolane-2-one, 4-methacryloyoxymethyl-4-vinyl-1,3-dioxolane-2-one, 4-methacryloyoxymethyl-4,5-dimethyl-1,3-dioxolane-2-one, 4-(3'butenoyloxymethyl)-1, 3-dioxolane-2-one, 4-(3'butenoyloxymethyl)-5-allyl-1,3-dioxolane-2-one, 4-(3'butenoyloxymethyl)-5-methoxymethyl-1,3-dioxolane-2-one, 4-(2'-butenoyloxymethyl)-5-allyoxymethyl-1,3-dioxolane-2-one, 4-(2'-butenoyloxymethyl)-4-ethyl-5-methyl-1,3-dioxolane-2-one and 4-(3'-butynoyloxymethyl)-1,3-dioxolane-2-one. Out of these, 4-acryloyloxymethyl-1,3-dioxolane-2-one, and 4-methacryloyoxymethyl-5-vinyl-1,3-dioxolane-2-one are used especially preferably.

(C) The cyclic carbonic ester which is a cyclic carbonic ester which is represented by the following (I):

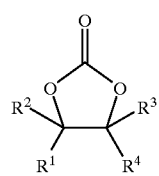

(I)

wherein at least one of $R^1$ to $R^4$ is a group represented by —$CH_2$—O—COO—X (wherein X is hydrogen atom, an alkyl group having 1 to 6 carbon atoms or an unsaturated hydrocarbon group having 2 to 6 carbon atoms) and the remaining groups, which may be the same or different, are any of hydrogen atom, an alkyl group having 1 to 6 carbon atoms, an unsaturated hydrocarbon group having 2 to 6 carbon atoms, a hydrocarbon group having 1 to 6 carbon atoms and containing the alkoxy group, alkanoyloxy group or alkenoyloxy group and an unsaturated hydrocarbon group having 2 to 6 carbon atoms and containing the alkoxy group. In the aforementioned Formula (I), X is preferably an unsaturated hydrocarbon group having 2 to 6 carbon atoms, and particularly the allyl group and the 1-propenyl group are used preferably.

Furthermore, the $R^1$ to $R^4$ of the cyclic carbonic ester represented by the aforementioned Formula (I) with the exception of —$CH_2$—O—COO—X are preferably H, —$CH_3$, —$C_2H_5$ or —$CH=CH_2$.

Specific examples of such cyclic carbonic ester(C) include 4-methoxycarbonyloxymethyl-1,3-dioxolane-2-one, 4-methoxycarbonyloxymethyl-5-vinyl-1,3-dioxolane-2-one, 4-methoxycarbonyloxymethyl-5-allyloxymethyl-1,3-dioxolane-2-one, 4-ethoxycarbonyloxymethyl-1,3-dioxolane-2-one, 4-ethoxycarbonyloxymethyl-5-methoxymethyl-1,3-dioxolane-2-one, 4-allyloxycarbonyloxymethyl-1,3-dioxolane-2-one, 4-allyloxycarbonyloxymethyl-5-methyl-1,3-dioxolane-2-one, 4-allyloxycarbonyloxymethyl-4-vinyl-1,3-dioxolane-2-one, 4-allyloxycarbonyloxymethyl-5-allyl-1,3-dioxolane-2-one, 4-allyloxycarbonyloxymethyl-5-(1'-propenyloxymethyl)-1,3-dioxolane-2-one, 4-(1'-propenyloxycarbonyloxymethyl)-1,3-dioxolane-2-one, 4-(1'-propenyloxycarbonyloxymethyl)-5-ethyl-1,3-dioxolane-2-one, 4-(1'-propenyloxycarbonyloxy-methyl)-5-allyoxymethyl-1,3-dioxolane-2-one, 4-(3'-butenyloxycarbonyloxymethyl)-5,5-dimethyl-1,3-dioxolane-2-one, 4-propanoxycarbonyloxymethyl-1,3-dioxolane-2-one and 4-propargyloxycarbonyloxymethyl)-5-vinyl-1,3-dioxolane-2-one.

Out of these, 4-methoxycarbonyloxymethyl-1,3-dioxolane-2-one, 4-allyloxycarbonyloxymethyl-1,3-dioxolane-2-one, 4-allyloxycarbonyloxymethyl-5-methyl-1,3-dioxolane-2-one and 4-(1'-propenyloxycarbonyloxymethyl)-1,3-dioxolane-2-one, for example, are preferable.

Next, an explanation is given of the compound (ii) represented by Formula (I), wherein at least one of $R^1$ to $R^4$ is an unsaturated hydrocarbon group, with the remaining groups selected from among hydrogen, the alkyl group, the aryl group and the unsaturated hydrocarbon group.

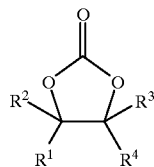

(I)

In the Formula(I), $R^1$, $R^2$, $R^3$ and $R^4$, which may be the same or different, are preferably hydrogen atom, an alkyl group having 1 to 4 carbon atoms, an unsaturated hydrocarbon group having 2 to 4 carbon atoms or an aryl group having 6 to 12 carbon atoms and at least one of $R^1$ to $R^4$ is an unsaturated hydrocarbon group having 2 to 4 carbon atoms.

Examples of such cyclic carbonic ester(ii) include 4-vinylethylene carbonate which is represented by Formula (I) wherein $R^1$, $R^2$ and $R^3$ are H and $R^4$ is the vinyl group; 4,5-divinylethylene carbonate which is represented by Formula (I) wherein $R^1$ and $R^3$ are H and $R^2$ and $R^4$ are the vinyl group; 4-methyl-4-vinylethylene carbonate which is represented by Formula (I) wherein $R^1$ and $R^2$ are H. $R^3$ is the methyl group, and $R^4$ is the vinyl group; 4-vinyl-5-methylethylene carbonate which is represented by Formula (I) wherein $R^1$ and $R^3$ are H, $R^2$ is the methyl group, and $R^4$ is the vinyl group; 4-(1',3'-butadienenyl)ethylene carbonate which is represented by Formula (I) wherein $R^1$, $R^2$ and $R^3$ are H and $R^4$ is the 1',3'-butadienenyl group; and 4-(2',2'-dimethyl)vinylethylene carbonate which is represented by Formula (I) wherein $R^1$, $R^2$ and $R^3$ are H, $R^4$ is the 2',2'-dimethylvinyl group.

As the cyclic carbonic ester(ii) represented by the aforementioned Formula(I) is preferably a compound whose $R^1$ is $CH=CH_2$, especially preferably vinylethylene carbonate or 4,5-divinylethylene carbonate whose $R^1$ is $CH=CH_2$, $R^3$ is $CH=CH_2$ or hydrogen atom and $R^2$ and $R^4$ are hydrogen atom.

Next, an explanation is given of the compound(iii) represented by Formula (I), wherein $R^1$ to $R^4$ is a group selected from between the alkyl group and the aryl group.

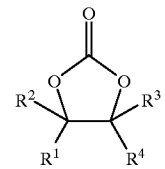

(I)

In the Formula(I), $R^1$ to $R^4$, which may be the same or different, are a group selected from between the alkyl group and the aryl group. The alkyl group is preferably an alkyl group having 1 to 6 carbon atoms, more preferably an alkyl group having 1 to 4 carbon atoms. The aryl group is preferably an aryl group having 6 to 20 carbon atoms, more preferably an aryl group having 6 to 12 carbon atoms.

In the Formula, $R^1$ to $R^4$, which may be the same or different, are most preferably an alkyl group having 1 to 4 carbon atoms or an aryl group having 6 to 12 carbon atoms.

Examples of such cyclic carbonic ester(iii) include 4,4,5,5-tetramethyl-1,3-dioxolane-2-one, 4-ethyl-4,5,5-trimethyl-1,3-dioxolane-2-one, 4-phenyl-4,5,5-trimethyl-1,3-dioxolane-2-one and 4,4-diethyl-5,5-dimethyl-1,3-dioxolane-2-one.

The preferable examples of the cyclic carbonic ester(iii) are 4,4,5,5-tetramethyl-1,3-dioxolane-2-one and 4,4,5,5-tetraethyl-1,3-dioxolane-2-one whose $R^1$ to $R^4$ is $CH_3$ or $C_2H_5$ in the Formula.

Next, below is given an explanation of the compound(2) represented by the following Formula (II):

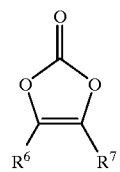

(II)

(wherein $R^6$ and $R^7$, which may be the same or different, are the alkyl group or the unsaturated hydrocarbon group).

In the Formula, $R^6$ and $R^7$, which may be the same or different, are preferably an alkyl group having 1 to 4 carbon atoms or the unsaturated hydrocarbon group having 2 to 4 carbon atoms.

Examples of such cyclic carbonic ester(2) include vinylene carbonate, 4,5-dimethylvinylene carbonate and 4-ethylvinylene carbonate.

The preferable examples of cyclic carbonic ester(3) are vinylene carbonate, 4-methylvinylene carbonate and 4,5-dimethylvinylene carbonate whose $R^6$ and $R^7$ are hydrogen atom or the methyl group.

Below is given an explanation of the compound (3) represented by Formula (III).

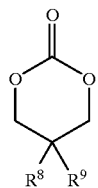

(III)

wherein $R^8$ and $R^9$, which may be the same or different, are the alkyl group, the aryl group or the unsaturated hydrocarbon group.

Examples of such cyclic carbonic ester(3) include 5,5-dimethyl-1,3-dioxane-2-one, 5,5-diethyl-1,3-dioxane-2-one 5,5-divinyl-1,3-dioxane-2-one, 5-vinyl-5-methyl-1,3-dioxane-2-one and 5-ethyl-5-methyl-1,3-dioxane-2-one.

The preferable examples of the cyclic carbonic ester(3) are 5,5-dimethyl-1,3-dioxane-2-one and 5,5-diethyl-1,3-dioxane-2-one whose $R^8$ and $R^9$ are $CH_3$ or $C_2H_5$.

Such cyclic carbonic esters represented in (1), (2) and (3) above show excellent acid resistance, are not oxidized when allowed to stand in the atmosphere, and are chemically stable without reacting with water under normal storage conditions or reacting with highly reactive substances such as metal lithium. Furthermore, such cyclic carbonic esters have the properties of being physically safe, being not readily thermally decomposed and being flame-retardant and resistant to electrochemical oxidation or reduction.

Therefore, such cyclic carbonic esters can be used suitably for a solvent for the electrolytic solutions for use in capacitors, batteries and electrochemical reactions. Moreover, such cyclic carbonic esters can be used suitably in pharmaceuticals, agrochemicals, acrylic fiber processing agents, polymer compound solvents and organic intermediates. Non-aqueous solvent for electrolytic solution:

In the present invention, non-aqueous solvents containing the aforementioned cyclic carbonic esters are used as the solvent for electrolytic solution. Such solvent may be one or more solvents of the aforementioned cyclic carbonic ester or a mixed solvent with another solvent.

Examples of such another solvent include cyclic carbonic esters such as ethylene carbonate, propylene carbonate, butylene carbonate and vinylene carbonate; chain carbonic esters such as dimethyl carbonate, methylethyl carbonate, diethyl carbonate, methylpropyl carbonate and methylisopropyl carbonate; cyclic esters such as γ-butyrolactone, 3-methyl-γ-butyrolactone and 2-methyl-γ-butyrolactone; chain esters such as methyl formate, ethyl formate, methyl acetate, ethyl acetate, propyl acetate, methyl propionate, methyl butyrate and methyl valerate; cyclic ethers such as 1,4-dioxane, 1,3-dioxolane, tetrahydrofurane, 2-methyl tetrahydrofurane and 3-methyl-1,3-dioxolane,; chain ethers such as 1,2-dimethoxyethane, 1,2-diethoxyethane, diethylether, dimethylether, methylethylether and dipropylether; and sulfur-containing compounds such as sulfolane.

Further, as cyclic carbonic ester, the cyclic carbonic ester having the halogen atom-substituted alkyl group described in Japanese Laid-open Patent Publication HEI 9-63644 may be used in addition to the aforementioned cyclic carbonic esters given as examples. Examples of such cyclic carbonic esters include monofluoromethylene carbonate, difluoromethylene carbonate and trifluoromethyl-ethylene carbonate.

These solvents may be used singly or in combination with one or more of them.

In the present invention, if the cyclic carbonic-ester represented in (1), (2) and (3) above and another solvent are mixed, the cyclic carbonic ester represented in (1), (2) and (3) above is contained in such electrolyte solvent preferably in the amount of at least 0.1 wt %, preferably not less than 0.5 wt %, more preferably 1 to 100 wt %, against the total amount of the electrolyte solvent.

Electrolyte:

Specific examples of the electrolyte contained in the non-aqueous electrolytic solution for capacitors to which the present invention relates include ammonium salts such as tetrabutylammonium tetrafluoroborate (($C_4H_9)_4NBF_4$), tetraethylammonium tetrafluoroborate (($C_2H_5)_4NBF_4$), triethyl-monomethylammonium tetrafluoroborate ($(C_2H_6)_3(CH_3)NBF_4$), tetrabutylammonium hexafluorophosphate (($C_4H_9)_4NPF_6$), tetraethylammonium hexafluorophosphate ($(C_4H_5)_4NPF_6$) and triethyl moonomethylammonium hexafluorophosphate tetrafluorophosphate (($C_2H_5)_3(CH_3)NPF_6$); phosphonium salts such as tetrabutylphosphonium (($C_4H_9)_4PBF_4$), tetraethylphosphonium tetrafluoroborate (($C_2H_5)_4PBF_4$), tetrabutylphosphonium hexafluorophosphate (($C_2H_9)_4PPF_6$) and tetraethylphosphonium tetrafluorophosphate (($C_2H_6)_4PPF_6$); and the electrolytes used normally for the electrolytic solutions for electric double layer capacitors, such as the electrolyte described in the International Publication WO95/15572 Publication.

Out of these, $(C_4H_9)_4NBF_4$, $(C_2H_6)_4NBF_4$ and $(C_2H_5)_3(CH_3)NBF_4$ are preferably used.

The electrolyte is contained in an amount of normally 0.1 to 3 mol/liter, preferably 0.4 to 1.5 mol/liter, more preferably 0.5 to 1.5 mol/liter in such non-aqueous electrolytic solution for capacitors. Since the non-aqueous electrolytic solution for electric double layer capacitors of the present invention contains the cyclic carbonic ester represented in (1),(2) and (3), it shows high potential window of electrochemical stability and excellent charging/discharging cycle properties. Moreover, the non-aqueous electrolytic solution of the present invention shows a high flash point and excellent safety performance compared with such conventional solvents used for electrolytic solutions as 1,3-dioxolane, tetrahydrofuran and 1,2-diethoxyethene. Because of this,, the use of he non-aqueous electrolytic solution for electric double layer capacitors of the present invention enables the obtaining of electric double layer capacitors which show high safety performance and high with-stand voltage and excellent charging/discharging cycle properties.

Capacitors:

The electric double layer capacitors are made up of two electrodes, a separator and normally a corrosion-resistant electrolytic solution. The two electrodes formed from a material having a large surf ace area such as activated carbon and a binder such as fluororesins are so arranged that they face each other via a porous separator made of polyethylene or polypropylene, and the space between these electrodes and the porous separator and the inside of the porous separator are filled with the electrolytic solution.

As the electrodes, electrodes formed from a material having a large surface area such as activated carbon and a binder such as fluororesins are preferably used.

As the electrode material, activated carbon is preferable. As examples of activated carbon, fibrous or powder activated carbons can be cited, such as phenol-based, pitch-based, polyacrylonitrile-based and coconut-shell-based activated carbons. Normally, activatedcarbons having a specific surface area of not less than 1,000 m²/g are preferable. Further, as examples of the method for activating carbon, the steam activation and alkali activation methods can be cited.

As examples of the binder, carboxymethylcellulose, polyvinylidene chloride, polyvinyl pyrrolidone, polyimide, polyvinyl alcohol and polyacrylic acid. Further, a combination of the aforementioned electrode material (activated material and a collector is normally used preferably for the electrodes.

As the collector, aluminum foil, for example, is used preferably.

As preferable examples of the separator, porous films and nonwoven fabrics made from polyolefin such as polyethylene and polypropylene can be cited.

Given below is an explanation of a specific example of the electric double layer capacitors, using a drawing.

Figure 2:
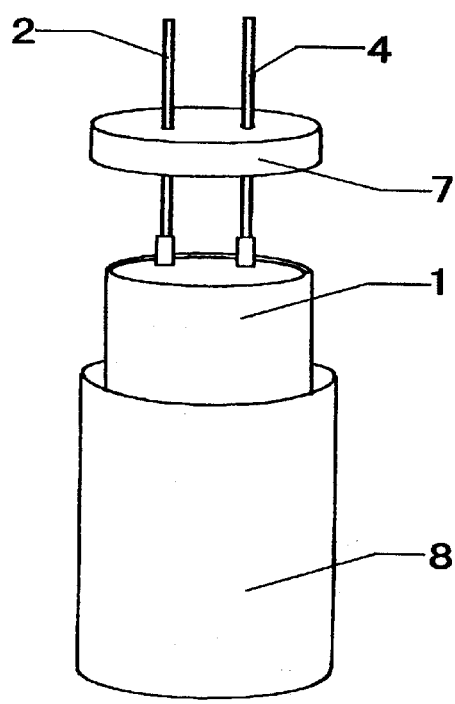
FIG. 2 is a perspective view illustrating the state of the aforementioned capacitor element being inserted into the metal case as a part integral with the sealing part.

FIG. 1 and FIG. 2 show the structure of the capacitor element of a wound-type electric double layer capacitor, which is a type of electric double layer capacitor and the state of the aforementioned capacitor element being inserted into the metal case as a part integral with the sealing part. In FIG. 1 and FIG. 2, 1 represents a capacitor element, and this capacitor Element 1 is formed by winding Polarizable Electrode 3 on the anode side to which Anode Side Lead Wire 2 is connected and Polarizable Electrode 5 on the cathode side to which Cathode Side Lead Wire 4 is connected, with Separator 6 placed in-between. Sealing Part 7, made of rubber, is attached to the Anode Site Lead Wire 2 and Cathode Site Lead Wire 4 of Capacitor Element 1. Further, Capacitor Element 1, previously impregnated with a driving electrolytic solution, is put in Metal Case 8 made of aluminum in a bottomed cylindrical form. As a result of Capacitor Element 1 being housed in Metal Case 8, Sealing Part 7 is located at the opening of Metal Case 8, and the opening of Metal Case 8 is sealed by subjecting the case to the processing of side squeezing and curling. As a result, Sealing Part 7 is caused to fit into the opening of Metal Case 8.

In the foregoing, an explanation is given of an electric double layer capacitor of the wound type. However, the same effect can also be achieved by using the electrolytic solution of the present invention in other electric double layer capacitors having a structure different from that of the wound-type electric double layer capacitor, such as the electric double layer capacitor of the coin type described in the Japanese Published Patent HEI 3-51284 Publication and the electric double layer capacitor of the laminated type described in the Japanese Laid-open Patent HEI 8-78291 Publication.

EXAMPLES

In the following examples are described several preferred embodiments to illustrate the present invention. However, it is to be understood that the present invention is not intended to be limited to the specific embodiments.

In this patent application, the evaluation of the potential window of electrochemical stability of the electrolytic solution and the charging/discharging test were conducted as described below.

The results are shown in Table 1.

Potential window of electrochemical stability:

The aforementioned electrolytic solution was put in a three-pole potential window of electrochemical stability determination cell using a glassy carbon electrode for the work electrode and the counter electrode and an Ag/Ag+ electrode as the reference electrode, and the electric potential was scanned at 10 mV/sec by use of a potentiogalvanostat. With the Ag/Ag+ electrode used as the reference, the range in which not less than 1 $\mu$A of oxidation reduction decomposition current did not flow was regarded as potential window of electrochemical stability.

Charging/discharging Test:

A charging/discharging test was conducted in which the process of charging a capacitor up to a final charging voltage of 3.5V at a charging current of 3A in an environment at 70° C. and then discharging the capacitor to a final discharging voltage of 1.5V at a discharging current of 3A was determined to be one cycle. Under these conditions, the amount of change in the capacity of the wound-type electric double layer capacitor after 10,000 cycles was determined.

Example 1

25 milliliters of non-aqueous electrolytic solution were prepared by dissolving 2.17 g (0.01 mol) of tetrafluoroborate tetraethylammonium $((C_2H_5),NBF_4)$ in 4-methacryloyloxymethyl-1,3-dioxolane-2-one (electrolyte concentration: 0.5 mol/liter). The potential window of electrochemical stability of the electrolytic solution thus obtained was determined.

Moreover, a wound-type electric double layer capacitor with a rated capacity of 2.3V 30 F (18 mm in diameter×40 mm in length) as shown in FIG. 1 and FIG. 2 was prepared by using the non-aqueous electrolytic solution obtained as described above as the electrolytic solution, an aluminum foil, that its surface is roughened, coated with a slurry in water of a mixed powder of coconut shell activated carbon powder, acetylene black and carboxymethylcellulose in the prescribed thickness and dried as the polarizable electrode, and nonwoven fabrics made from polypropylene as the separator. A charging/discharging test was conducted on the wound-type electric double layer capacitor.

Further, in the following Examples, wound-type electric double layer capacitors similar to the one of Example 1 were prepared, and a charging/discharging test was conducted on the wound-type electric double layer capacitors.

Example 2

25 milliliters of non-aqueous electrolytic solution were prepared by dissolving 2.71 g (0.0125 mol) of tetrafluoroborate tetraethylammonium $((C_2H_5)_4NBF_4)$ in 4-acryloyloxymethyl-1,,3-dioxolane-2-one (electrolyte concentration: 0.5 mol/liter). The electrolytic solution thus obtained was evaluated in the same manner as described in Example 1. Moreover, a wound-type electric double layer capacitor was prepared in the same manner as described in Example 1 except that the electrolytic solution thus obtained was used. A charging/discharging test was conducted on the wound-type electric double layer capacitor under the same conditions used in Example 1.

The results are shown in Table 1.

Comparative Example 1

An electrolytic solution was prepared in the same manner as described in Example 1 except that propylene carbonate was used in place of 4-methacryloyloxymethyl-1,3-dioxolane-2-one in Example 1.

Moreover, a wound-type electric double layer capacitor was prepared in the same manner as described in Example 1 except that the electrolytic solution of Comparative Example 1 is used. A charging/discharging test was conducted on the wound-type electric double layer capacitor under the same conditions as those of Examples 1 and 2.

The results are shown in Table 1.

TABLE 1

| | | Potential window of electrochemical stability (V vs Ag/Ag+) | | | |
|---|---|---|---|---|---|
| | | Oxidation potential (V vs Ag/Ag+) | Reduction potential (V vs Ag/Ag+) | Potential difference (V) | Amount of change in capacity (%) |
| Example 1 | 4-methacryloyloxymethyl-1,3-dioxolane-2-one | 3.8 | −3.3 | 7.1 | −4 |
| Example 2 | 4-acryloyloxymethyl-1,3-dioxolane-2-one | 4.8 | −3.5 | 8.3 | −3 |
| Comparative Example 1 | Propylene carbonate | 2.4 | −3.1 | 5.5 | −12 |

It can be seen from Table 1 that since Examples 1 and 2 show high oxidation potential and a significant potential difference between oxidation potential and reduction potential compared with Comparative Example 1, Examples 1 and 2 show high potential window of electrochemical stability. Furthermore, it can also be seen that since the wound-type electric double layer capacitors using the electrolytic solutions of Examples 1 and 2 show only a slight change in capacity after the charging/discharging test compared with the wound-type electric double layer capacitors using the electrolytic solutions of Comparative Example 1, the use of the electrolytic solution of the present invention makes possible the formation of electric double layer capacitors which show high with-stand voltage and excellent charging/discharging cycle properties.

Example 3

25 milliliters of non-aqueous electrolytic solution were prepared by dissolving 2.17 g (0.01 mol) of tetrafluoroborate tetraethylammonium ($(C_2H_5)_4NBF_4$) in 4-allyloxycarbonyloxymethyl-1,3-dioxolane-2-one (electrolyte concentration: 0.5 mol/liter). The potential window of electrochemical stability of the electrolytic solution thus obtained was determined. A charging/discharging test was conducted on the wound-type electric double layer capacitor thus obtained in the same manner as described in Example 1.

The results are shown in Table 2.

Example 4

25 milliliters of non-aqueous electrolytic solution were prepared by dissolving 2.71 g (0.0125 mol) of tetrafluoroborate tetraethylammonium ($(C_2H_5)_4NBF_4$) in a mixed solvent of 4-methyloxycarbonyloxymethyl-1,3-dioxolane-2-one and propylene carbonate mixed in a ratio by weight of 1:4 (electrolyte concentration: 0.5 mol/liter). The potential window of electrochemical stability of the electrolytic solution thus obtained was determined.
A charging/discharging test was conducted on the wound-type electric double layer capacitor thus obtained in the same manner as described in Example 1.

The results are shown in Table 2.

Example 5

25 milliliters of non-aqueous electrolytic solution were prepared by dissolving 2.71 g (0.0125 mol) of tetrafluoroborate tetraethylammonium ($(C_2H_5)_4NBF_4$) in 4-allyloxymethyl-1,3-dioxolane-2-one (electrolyte concentration: 0.5 mol/liter). The potential window of electrochemical stability of the electrolytic solution thus obtained was determined. A charging/discharging test was conducted on the wound-type electric double layer capacitor thus obtained in the same manner as described in Example 1.

The results are shown in Table 2.

Example 6

A non-aqueous electrolytic solution was prepared in the same manner as described in Example 5 except that 4-(1'-propenyloxymethyl)-1,3-dioxolane-2-one was used in place of 4-allyloxymethyl-1,3-dioxolane-2-one. The potential window of electrochemical stability of the electrolytic solution thus obtained was determined. A charging/discharging test was conducted on the wound-type electric double layer capacitor thus obtained in the same manner as described in Example 1.

The results are shown in Table 2.

Example 7

A non-aqueous electrolytic solution was prepared by dissolving 2.71 g (0.0125 mol) of tetrafluoroborate tetraethylammonium ($(C_2H_5)_4NBF_4$) in 4-vinylethylene carbonate (electrolyte concentration: 0.5 mol/liter). The potential window of electrochemical stability of the electrolytic solution thus obtained was determined. A charging/discharging test was conducted on the wound-type electric double layer capacitor thus obtained in the same manner as described in Example 1.

The results are shown in Table 2.

Example 8

A non-aqueous electrolytic solution was prepared in the same manner as described in Example 7 except that 4,5-divinylethylene carbonate was used in place of 4-vinylethylene carbonate. The potential window of electrochemical stability of the electrolytic solution thus obtained was determined. A charging/discharging test was conducted on the wound-type electric double layer capacitor thus obtained in the same manner as described in Example 1.

The results are shown in Table 2.

Example 9

25 milliliters of non-aqueous electrolytic solution were prepared by dissolving 2.71 g (0.0125 mol) of tetrafluoroborate tetraethylammonium ($(C_2H_5)_4NBF_4$) in a mixed solvent of 4-vinylethylene carbonate and propylene carbonate mixed in a ratio by weight of 5:95 (electrolyte concentration: 0.5 mol/liter). The potential window of electrochemical stability of the electrolytic solution thus obtained was determined in the same manner as described in Example 1. A charging/discharging test was conducted on the wound-type electric double layer capacitor thus obtained in the same manner as described in Example 1.

The results are shown in Table 2.

Example 10

25 milliliters of a non-aqueous electrolytic solution was prepared by dissolving 2.71 g (0.0125 mol) of tetrafluoroborate-4-ethylammonium ($(C_2H_5)_4NBF_4$) in vinylene carbonate (electrolyte concentration: 0.5 mol/liter).

The potential window of electrochemical stability of the electrolytic solution thus obtained was determined. A charging/discharging test was conducted on the wound-type electric double layer capacitor thus obtained in the same manner as described in Example 1.

The results are shown in Table 2.

Example 11

25 milliliters of non-aqueous electrolytic solution were prepared by dissolving 2.71 g (0.0125 mol) of tetrafluoroborate tetraethylammonium (($C_2H_5$)$_4NBF_4$) in a mixed solvent of propylene carbonate and vinylene carbonate mixed in a ratio by weight of 95:5 (electrolyte concentration: 0.5 mol/liter). The potential window of electrochemical stability of the electrolytic solution thus obtained was determined. A charging/discharging test was conducted on the wound-type electric double layer capacitor thus obtained in the same manner as described in Example 1.

The results are shown in Table 2.

Example 12

25 milliliters of non-aqueous electrolytic solution were prepared by dissolving 2.71 g (0.0125 mol) of tetrafluoroborate tetraethylammonium (($C_2H_5$)$_4NBF_4$) in a mixed solvent of 5,5-dimethyl-1,3-dioxane-2-one and propylene carbonate mixed in a ratio by weight of 1:1 (electrolyte concentration: 0.5 mol/liter). The potential window of electrochemical stability of the electrolytic solution thus obtained was determined. A charging/discharging test was conducted on the wound-type electric double layer capacitor thus obtained in the same manner as described in Example 1.

The results are shown in Table 2.

TABLE 2

| | | Potential window of electrochemical stability (V vs Ag/Ag+) | | | |
|---|---|---|---|---|---|
| | | Oxidation potential (V vs Ag/Ag+) | Reduction potential (V vs Ag/Ag+) | Potential difference (V) | Amount of change in capacity (%) |
| Example 3 | 4-allyloxy-carbonyloxy-methyl-1,3-dioxolane-2-one | 4.2 | −3.1 | 7.3 | −2 |
| Example 4 | 4-methyloxy-carbonyloxy-methyl-1,3-dioxolane-2-one/propylene carbonate (1/4) | 3.0 | −3.1 | 6.1 | −3 |
| Example 5 | 4-allyloxy-methyl-1,3-dioxolane-2-one | 3.6 | −3.1 | 6.7 | −6 |
| Example 6 | 4-(1'-propenyloxymeth-yl)-1,3-dioxolane-2-one | 5.3 | −2.2 | 7.5 | −5 |
| Example 7 | 4-vinylethylene carbonate | 2.8 | −2.1 | 4.9 | −7 |
| Example 8 | 4,5-vinylethylene carbonate | 3.1 | −2.2 | 5.3 | −8 |
| Example 9 | 4-vinylethylene carbonate/propylene carbonate (5/95) | 3.1 | −2.3 | 5.4 | −9 |
| Example 10 | Vinylene carbonate | 3.6 | −2.6 | 6.2 | −4 |
| Example 11 | Vinylene carbonate/propylene carbonate (5/95) | 3.0 | −2.7 | 5.7 | −5 |
| Example 12 | 5,5-dimethyl-1,3-dioxane-2-one/propylene carbonate (1/1) | 3.6 | −2.6 | 6.2 | −6 |

Further, in the foregoing, an explanation was given of the non-aqueous electrolytic solution for capacitors by using electric double layer capacitors as examples. However, the present invention is by no means limited by this, and the same effect can be achieved even in the case of using the electrolytic solution for aluminum electrolytic capacitors.

What we claim is:

1. A non-aqueous electrolytic solution for capacitor comprising an electrolyte and a non-aqueous solvent containing at least one cyclic carbonic ester of I, [II,] III or mixtures thereof, where ester I has the formula,

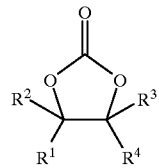
(I)

where $R^1$ to $R^4$, which may be the same or different, meet one of the following conditions:
(i) at least one of $R^1$ to $R^4$ is —$CH_2$—O—A, wherein A is $R^5$, CO—$R^5$ or CO—O—$R^5$ where $R^5$ is an alkyl group or an unsaturated hydrocarbon group, and the remaining $R^1$ to $R^4$ is selected from H, alkyl groups or unsaturated hydrocarbon groups;
(ii) at least one of $R^1$ to $R^4$ is an unsaturated hydrocarbon group and the remaining $R^1$ to $R^4$ is selected from H, alkyl groups, aryl groups or unsaturated hydrocarbon groups;

(iii) at least one of $R^1$ to $R^4$ is an aryl group and the remaining $R^1$ to $R^4$ are selected from alkyl groups or aryl groups; and
where ester III has the formula,

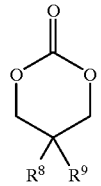

(III)

where $R^8$ and $R^9$, which may be the same or different, are selected from alkyl groups, aryl groups or unsaturated hydrocarbon groups, and at least one of $R^8$ and $R^9$ is an aryl group or an unsaturated hydrocarbon group.

2. The non-aqueous electrolytic solution for capacitors of claim 1, wherein the alkyl group has 1 to 6 carbon atoms, the unsaturated hydrocarbon group has 2 to 6 carbon atoms and the aryl group has 6 to 12 carbon atoms.

3. The non-aqueous electrolytic solution for capacitors of claim 1, wherein the cyclic carbonic ester is a compound which is represented by the formula I,

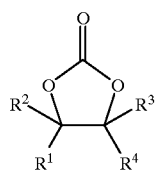

(I)

wherein $R^1$, $R^2$, $R^3$ and $R^4$, which may be the same or different, are H, an alkyl group having 1 to 4 carbon atoms, an unsaturated hydrocarbon group having 2 to 4 carbon atoms or an aryl group having 6 to 12 carbon atoms and at least one of $R^1$ to $R^4$ is an unsaturated hydrocarbon group having 2 to 4 carbon atoms.

4. A non-aqueous electrolytic solution for capacitors which comprises an electrolyte and a cyclic carbonic ester of the formula IV,

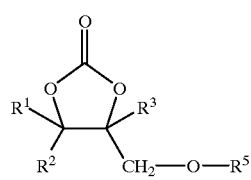

(IV)

wherein $R^1$ to $R^3$, which may be the same or different, are H, an alkyl group having 1 to 6 carbon atoms, an unsaturated hydrocarbon group having 2 to 6 carbon atoms, a hydrocarbon group having 1 to 7 carbon atoms and containing the alkoxy group or an unsaturated hydrocarbon group having 2 to 7 carbon atoms and containing the alkoxy group, and $R^5$ is an alkyl group having 1 to 6 carbon atoms or an unsaturated hydrocarbon group having 2 to 6 carbon atoms both of which may or may not contain oxygen.

5. A non-aqueous electrolytic solution for capacitors which comprises an electrolyte and a cyclic carbonic ester of the formula I,

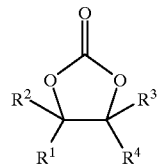

(I)

wherein at least one of $R^1$ to $R^4$ is —$CH_2$—O—CO—X wherein X is a hydrogen atom, an alkyl group having 1 to 6 carbon atoms or an unsaturated hydrocarbon group having 2 to 6 carbon atoms; and the remaining groups, which may be the same or different, are any of H; an alkyl group having 1 to 6 carbon atoms; an unsaturated hydrocarbon group having 2 to 6 carbon atoms; a hydrocarbon group having 1 to 6 carbon atoms and containing the alkoxy group; an alkanoyloxy group; or an alkenoyloxy group and an unsaturated hydrocarbon group having 2 to 6 carbon atoms and containing the alkoxy group, the alkanoyloxy group or the alkenoyloxy group.

6. A non-aqueous electrolytic solution for capacitors which comprises an electrolyte and a cyclic carbonic ester of the formula I,

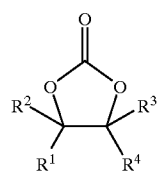

(I)

wherein at least one of $R^1$ to $R^1$ is—$CH_2$—O—COO—X wherein X is H, an alkyl group having 1 to 6 carbon atoms or an unsaturated hydrocarbon group having 2 to 6 carbon atoms, and the remaining groups, which may be the same or different, are any of H, an alkyl group having 1 to 6 carbon atoms, an unsaturated hydrocarbon group having 2 to 6 carbon atoms, a hydrocarbon group having 1 to 6 carbon atoms and containing the alkoxy group, and an unsaturated hydrocarbon group having 2 to 6 carbon atoms and containing the alkoxy group.

7. The non-aqueous electrolytic solution for capacitors of claim 1, wherein the cyclic carbonic ester is a compound which is represented by the formula I,

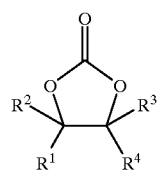

(I)

wherein $R^1$ to $R^4$ are selected from between an alkyl group having 1 to 4 carbon atoms and an aryl group having 6 to 12 carbon atoms, and at least one of $R^1$ to $R^4$ is the aryl group having 6 to 12 carbon atoms.

8. The non-aqueous electrolytic solution for capacitors of claim 1, wherein the cyclic carbonic ester is a compound which is represented by formula III,

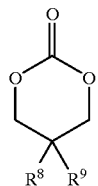
(III)

wherein $R^8$ and $R^9$, which may be the same of different, are an alkyl group having 1 to 4 carbon atoms, an unsaturated hydrocarbon group having 2 to 4 carbon atoms or an aryl group having 6 to 12 carbon atoms, and at least one of $R^8$ and $R^9$ is an aryl group or an unsaturated hydrocarbon group.

9. A capacitor comprising the non-aqueous electrolytic solutions as claimed in any of claims 1 through 8.

10. The capacitor as claimed in claim 9, wherein the capacitor is an electric double layer capacitor.

11. An electric double layer capacitor comprising a polarizable electrode on an anode side, a polarizable electrode on a cathode side, a separator and an electrolytic solution, characterized in that the polarizable electrodes are electrodes using activated carbon powder as the electrode material and the electrolytic solution is the electrolytic solution as claimed in any of claims 1 through 8.

12. The electric double layer capacitor as claimed in claim 11, wherein the polarizable electrodes are the electrodes obtained by coating onto a collector foil a mixed powder of activated carbon powder to which acetylene black and carboxymethylcellulose are added and drying it.

* * * * *